(12) United States Patent
Bazakos et al.

(10) Patent No.: US 7,362,210 B2
(45) Date of Patent: Apr. 22, 2008

(54) SYSTEM AND METHOD FOR GATE ACCESS CONTROL

(75) Inventors: Michael E. Bazakos, Bloomington, MN (US); Rida M. Hamza, Eagan, MN (US); David W. Meyers, Brooklyn Park, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/979,129

(22) Filed: Nov. 3, 2004

(65) Prior Publication Data

US 2005/0110610 A1    May 26, 2005

Related U.S. Application Data

(63) Continuation-in-part of application No. 10/655,124, filed on Sep. 5, 2003, now Pat. No. 7,183,895.

(51) Int. Cl.
G08B 13/14    (2006.01)

(52) U.S. Cl. .............. 340/5.53; 340/550; 340/5.82; 340/5.81; 340/5.83; 340/5.52; 340/571; 340/5.7; 340/10.1; 340/825.72; 340/825.69; 382/118; 382/115

(58) Field of Classification Search .............. 340/550, 340/5.82, 5.81, 5.83, 5.52, 5.53, 5.7, 10.1, 340/825.72, 825.69; 382/118, 115; 235/375
See application file for complete search history.

(56) References Cited

U.S. PATENT DOCUMENTS 5,801,763 A * 9/1998 Suzuki ................. 348/77

(Continued)

FOREIGN PATENT DOCUMENTS

EP    2 337 839    1/1999

(Continued)

OTHER PUBLICATIONS

J. Dowdall et al., A face detection method based on multi-band feature extraction in the near-IR spectrum, XP002369556, Dec. 14, 2004, Publisher: IEEE Workshop on Computer Vision Beyond the Visible Spectrum, Published in: Kauai, Hawaii.

*Primary Examiner*—Brian Zimmerman
*Assistant Examiner*—Vernal Brown
(74) *Attorney, Agent, or Firm*—Kris T. Fredrick

(57) ABSTRACT

A system for providing stand-off biometric verification of a driver of a vehicle at a control gate while the vehicle is moving, including a pre-verification system and a post-verification systems. The pre-verification system is installed before an entrance of a facility and comprises an RFID vehicle tag reader, an RFID personal tag reader and a facial detection and recognition (verification) system. The RFID vehicle tag reader scans and reads an ID from an RFID vehicle tag of the vehicle that is trying to pass through the gate. The RFID personal tag reader reads an ID from an RFID personal tag carried by personnel who are driving in the vehicle. The facial detection and verification system scans and reads facial images for the driver. The post-verification system is installed on at least one of an entrance and an exit for post-verification to ensure that the vehicle that enters the entrance or leaves from the exit is the one that has been verified/denied at the control gate. In one embodiment, the post-verification system comprises an RFID personal tag reader and an RFID vehicle tag reader. In another embodiment, the post-verification system also comprises a facial detection and recognition system.

18 Claims, 9 Drawing Sheets

U.S. PATENT DOCUMENTS 6,275,157 B1 * 8/2001 Mays et al. ............... 340/572.5
6,657,538 B1 * 12/2003 Ritter ........................ 340/5.81
6,867,683 B2 * 3/2005 Calvesio et al. ........... 340/5.52

FOREIGN PATENT DOCUMENTS

EP  1 136 937  9/2001
EP  1 318 482  6/2003
GB  2 273 596  6/1994
WO  WO 03/023695 A1  3/2003

* cited by examiner

SYSTEM AND METHOD FOR GATE ACCESS CONTROL

This application is a continuation-in-part of U.S. patent application Ser. No. 10/655,124, filed on Sep. 5, 2003, now U.S. Pat. No. 7,183,895, which is herein incorporated by reference in its entirety.

BACKGROUND

1. Field of the Invention

The present invention relates generally to methods and systems for security identification, and more particularly, to methods and systems for personnel biometric verification.

2. Background of the Invention

Gate security access control has recently been given increased attention as it provides basic safety protection for facilities and individuals who work in the facilities. In a typical gate security system for a large facility, personnel must show their ID cards and/or display authorization tags on their vehicles in order to gain access to the facility. In some cases, where a guard is not located at the gate, personnel can use a data card, such as an electronic data card, to release a gate to gain access to the facility. Once inside the facility, personnel must typically use the data card to open doors to enter into specific secured areas.

One well known type of security access control system is based on radio frequency identification (RFID), which is illustrated in FIG. 1. RFID system 10 comprises three basic elements: an antenna or coil 11, a transceiver 12 (with decoder), and a transponder (i.e., an RFID tag) 13 electronically programmed with unique identification information. Antenna 11 emits radio frequency signals to activate tag 13 and read and write data to it, and functions as a conduit between tag 13 and transceiver 12. Antenna 11 can take on various shapes and sizes. For example, antenna 11 can be built into a door frame to receive tag data from persons or things passing through the door, or mounted on structures such as an interstate toll booth to monitor the traffic passing on a highway. Antenna 11 is often packaged with transceiver 12 and decoder (not shown) to function as a reader (or interrogator), which can be configured either as a handheld or a fixed-mount device. The reader emits radio waves in a range of one inch to 100 feet or more, thereby establishing a predetermined electromagnetic zone. When an RFID tag passes through the electromagnetic zone, it detects the reader's activation signals. The reader then decodes the data encoded in the tag's integrated circuit and the data is passed to a host computer 15 via an RF module 16 for processing. Generally, RFID tags 13 can be either active or passive. Active RFID tags are powered by an internal battery and are typically readable and rewriteable. In a typical read/write RFID system, an active RFID tag delivers a set of instructions to a machine, and the machine then acts upon those instructions. In contrast, passive RFID tags operate without a separate power source and obtain power generated from the reader.

A significant advantage of RFID systems is the non-contact and non-line-of-sight nature of the technology. In operation, when a person or subject carrying an RFID tag passes through a checkpoint, an RFID reader reads and decodes data stored in the RFID tag and sends the decoded data to a computer for processing. RFID tags can be read through a variety of substances such as snow, fog, ice, paint, and other visually and environmentally challenging conditions. RFID tags can also be read under challenging circumstances such as when RFID-tagged vehicles pass points at relatively high speeds.

RFID systems have been used to control facility access through a gate. In such a case, individuals carry an RFID tag (also referred to herein as a "personal tag") or display an RFID tag in their vehicle (also referred to herein as a "vehicle tag"). A reader composed of an RF transceiver and an antenna is installed at or near the gate so that when the individual and/or the vehicle is close to the gate, the RFID reader reads the data embedded in the RFID tags and sends the data to a computer for verification. If the data from the tag indicate that the individual or the vehicle is permitted entry, the gate will open to allow the individual or vehicle to enter. On the other hand, if the data shows that the individual or vehicle is not permitted entry, the gate will remain closed. In some cases, a guard will stop the vehicle to acquire more information from the individual or driver of the vehicle.

Reliance solely on an RFID system for identification, however, does not provide adequate security. Since the computer only matches the RFID tag with data stored in a database, it is possible that the person who is carrying a valid RFID tag is, in fact, not authorized to gain access. Also an unauthorized person, who by some means, obtains a valid RFID tag, will be granted access. Thus, a more advanced identification system is required.

Biometric verification is now being employed more frequently to verify personnel identification. Such systems typically comprise a database storing personal biometric information, such as facial templates or features, finger prints, hand geometry, iris prints, thermograms, skin colors of personnel, and others, or any combination of these. In a typical face identification imaging biometric system, the system takes an image or an image sequence of a person and then performs a "one-to-many" verification database search against the images stored in the database; this is done using 2D or 3D image processing technology. However, such a one-to-many search is very slow and often unreliable. Furthermore, present biometric verification systems typically require facial verification in a benign lighting and background environment with no relative facial movement. That is, the person who is requesting access must either stay still or move in a prescribed fashion while the system takes his/her image, or the individual must present their fingers or iris in direct contact to a biometric reader. This presentation requires direct contact and increases the overall time needed for completing the biometric verification task.

As higher levels of security and automation are increasingly demanded, an overall security system must be provided to adequately improve a facility's security posture. The security system must minimize negative effects to work efficiency and quality of work life. Due to the disadvantages of excessively long waiting times and unreliable results mentioned above, currently employed Facial Recognition Systems (FRS) and RFID systems cannot yet uniquely satisfy fast and accurate biometric verification requirements. Thus, a method and system that can more efficiently and rapidly identify personnel and/or vehicles is required.

BRIEF SUMMARY OF THE INVENTION

The present invention is a Fast Access Control Technology Solution (FACTS) and provides a fast and secure biometric verification method and system that can dynamically identify vehicles and/or personnel by combining RFID and advanced facial detection and recognition techniques. Significantly, the method functions without requiring a vehicle and/or an individual to stop or to be in a particular place or posture, or come into physical contact with a biometric device.

More specifically, the present invention provides a method and system for dynamic stand-off biometric verification, in which a Tri-Band Imaging (TBI) scheme is employed to detect and recognize the face of an enrolled individual whose physical ID and an assigned RFID tag are related in a personnel access control database.

In accordance with one embodiment of the present invention, the method for providing dynamic security verification comprises storing data regarding personal information and a face print (template) of the person in a database, wherein the face print is represented by numerical codes of a face digital image of the person. The method further comprises recording data regarding the personal ID information in a database, reading personal ID from the RFID tag at a first checkpoint, comparing the data with those stored in the database, retrieving a face print (usually a template) corresponding to the personal's RFID-related data in the database, and scanning (imaging) the face of the person at the checkpoint in two near-IR bands in the reflective region of the spectrum to obtain two facial images. These two facial images comprise a low (reflective IR) band facial image and an upper (reflective IR) band facial image. The method then performs a weighted subtraction of the two facial images (fusion), thresholds the resulting image, and performs noise cleaning to obtain an image of the exposed skin of the person. Because of the unique phenomenology of the upper IR band with respect to human skin, it can detect any alterations and disguises in the face, such as face masks of another person, or fake face parts (nose, mustache, hair, etc.), or heavy theater-type make-up. The method also performs a simultaneous video (visible band) scan of the face of the person, overlays the thresholded image (skin image on the video image (registered)), performs a model-based calculation to determine the face part of the skin in the video image (face detection) and then compares the detected face with the retrieved face print from the database.

In accordance with another embodiment, the face of the person (i.e., three-band facial images: low near-IR band, upper near-IR band, and the visible band mentioned above) is captured by a Tri-Band Imaging (TBI) system. Because of the common optics, the resulting three simultaneous images of the face of the person are precisely registered. If any of the associated three cameras operates with its own optics, the registration process is preferably performed algorithmically.

In accordance with still another embodiment, a system for dynamical stand-off verification comprises an RFID tag on which an ID number is stored, a computer database for storing data regarding information and face prints and other personal information of a plurality of individuals, an RFID tag reader for reading the ID from the RFID tag, a facial recognition system for scanning the face of the personnel and obtaining facial images for the personnel, and a computer for processing the data read by the RFID tag reader and the facial images obtained by the facial recognition system. The IDs of the vehicle and driver read by the RFID reader and the scanned facial images are sent to the computer. The computer, according to the received RF IDs, retrieves the vehicle ID and/or personnel ID from the database and determines if the received ID matches with a stored ID. The computer also processes the facial images from the TBI camera to obtain a final facial image, retrieves stored images from the database and compares the two.

In accordance with a preferred embodiment, the facial detection and recognition system comprises a near-IR illuminator for generating near-IR light, an illumination adjustment module for adjusting the near-IR light based on environmental lighting conditions, a TBI camera for precise face detection and tracking, and a computer for processing the facial images to complete the verification process.

The present invention further provides a method and system for post-verification of vehicles and/or individuals to ensure that unauthorized vehicles and/or individuals actually leave a facility, when denied access, and vehicles and/or individuals that are about to enter a second checkpoint have, in fact, been authorized to enter. The post-verification system and method are preferably employed after the vehicles and/or individuals have been biometrically-verified at a first checkpoint near an entry control gate of a facility. By providing a second checkpoint utilizing a post-verification step, biometric verification, when used as a gate control mechanism can be greatly enhanced, thereby providing increased security protection for facilities.

The post-verification method in accordance with the present invention comprises, at a second checkpoint, reading the ID of the RFID tag of the vehicle or the person (driver) or both, sending the RFID to the computer, and comparing the RFID read at the second checkpoint with those RFID read at the first checkpoint to see if those ID's not only match, but also are granted access. If the data do not either match or access is not granted, an alarm signal is generated to indicate that a mismatch has occurred. Preferably, the second checkpoint is located prior to a facility entrance.

In accordance with another embodiment, the face of the person is captured by a Tri-Band Imaging (TBI) system by obtaining three-band facial images: low near-IR band (1.1 micron region), upper near-IR band (1.8 micron region), and the visible band mentioned above. The useful range for those IR regions is from 1.1 microns to 2.4 microns (1.0 micron=$1\times10^{-6}$ meters.)

In accordance with still another embodiment, a system for dynamic stand-off verification comprises a first verification system checkpoint and a post-verification system second checkpoint. The first verification checkpoint system comprises an RFID tag on which an ID number is stored, a computer database for storing data regarding information and face prints and other personal information of a plurality of individuals, an RFID tag reader for reading the ID from the RFID tag, a facial recognition system for scanning the face of the personnel and obtaining facial images for the personnel, and a computer for processing the data read by the RFID tag reader and the facial images obtained by the facial recognition system. The RFID tags of the vehicle and driver read by the RFID reader and the scanned facial images are sent to the computer. The computer, according to the received RF IDs, retrieves the vehicle ID and personnel ID from the database and determines if the received IDs matches with database ID. The computer also processes the facial images from the TBI camera to obtain a final facial print (signature), retrieves stored image print from the database according to the RFID data received from the RFID reader, and compares the two images. The vehicle/individuals are then directed to an entrance or an exit of the facility, depending on whether the data read by the RFID tag reader matches with the data stored in the database and if the final facial image matches with the retrieved image according to the RFID data. The post-verification system comprises at least a second RFID tag reader that is installed at a second checkpoint near at least one of the entrance and/or exit for reading the RFID tag when the vehicle and/or individuals pass by the entrance. The RFID data read by the second RFID tag reader and the first RFID tag reader are sent to the computer for a further comparison and verification for access control.

DETAILED DESCRIPTION OF THE INVENTION

The method and system of the present invention leverage RFID and dynamic biometric verification techniques to provide secure and fast access control solutions.

In accordance with the present invention, the method and system preferably utilize a tri-band imaging system that can dynamically capture a face within the context of an ambiguous and possibly cluttered image frame. The resulting facial image is then uniquely linked by information related through an RFID tag and compared to a stored facial image template in a database.

Since the present invention utilizes RFID to identify vehicles and personnel in combination with a dynamic facial recognition technique to identify face prints of the personnel, the present invention is capable of capturing key vehicle information and biometric data while a vehicle is moving at relative high speeds. According to the present invention, a dynamic facial recognition biometric scheme can scan a facial image of a subject, even at vehicle speeds up to about 40 miles per hour. Higher speeds can be accomplished using higher speed cameras and processors. An RFID scheme can read data from RFID tags at an even higher rate. Therefore, the present invention is particularly beneficial for use as a gate access control system for vehicles and personnel at a main gate of a facility, such as a military base, a governmental office or other locations that require increased security measures with positive biometric verification. The present invention, however, is not limited to gate access control applications. For example, the dynamic biometric verification of the present invention can also be beneficially used inside an office building to control personnel entering into different work areas. Furthermore, by double-checking the identification of a person by matching the RFID information and the facial information, the method and system of the present invention are capable of providing more secure positive biometric identification.

Figure 2:
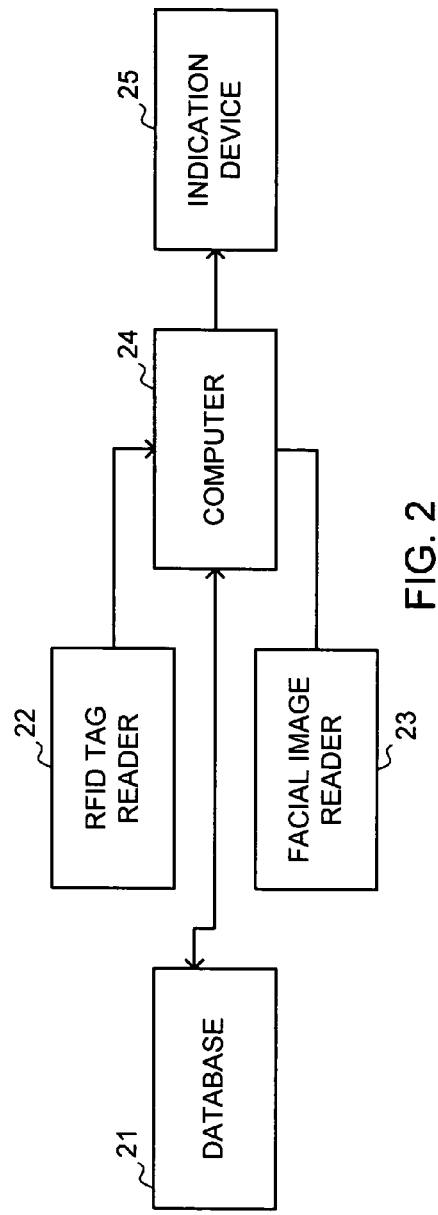
FIG. 2 is a schematic block diagram of a security system in accordance with a first embodiment of the present invention.

FIG. 2 is a schematic block diagram of a security system in accordance with a first embodiment of the present invention. The security system of FIG. 2 comprises a central computer (not shown) that preferably first stores relationship information of personnel and (if desired) their vehicles, as well as the personnels' biometric features in a database 21. This function can also be performed by computer 24. The relationship information of the personnel and their vehicles may include, for example, the license plate numbers, model types and colors of the vehicles. The biometric features of the personnel may include, for example, their facial images/ photographs, their processed templates, and other data such as racial information (for example, facial skin and features) and cultural information (for example, the wearing of hats, hair styles, etc.) as well any desired ancillary information such as: address, phone numbers, social security number, etc. In accordance with the present invention, the facial information may be encoded by an exemplary local feature analysis (LFA) algorithm, which maps a face and creates a "face print" that is a unique numerical code for that face. Such techniques are well known in the art. After all the information has been stored in database 21, RFID tags (not shown) on which is recorded unique ID numbers, are given to the personnel for carrying and/or displaying on their vehicles. The vehicle RFID tags store a RFID vehicle tag that uniquely identifies the vehicle, and an RFID personnel tag that uniquely identifies the person who drives or owns the vehicle. The RFID vehicle tag may be mounted on the vehicle and the RFID personnel tag may be carried by the person.

Figure 1:
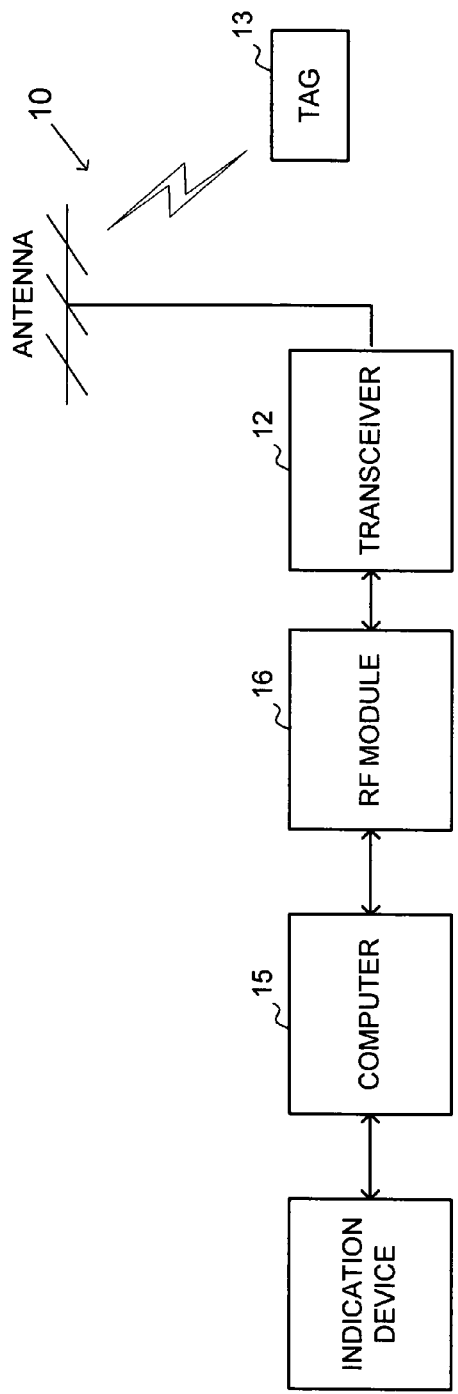
FIG. 1 depicts a prior art RFID system.

The system of FIG. 2 further includes an RFID tag reader 22 and a facial image reader 23, such as a TBI camera. The RFID tag reader 22 is used to read ID from RFID tags carried by personnel and/or mounted on vehicles, such as the RFID vehicle tags and the RFID personnel tags mentioned above. RFID tag reader 22 may include an RFID vehicle tag reader and an RFID personal tag reader (both of which will be described with reference to FIG. 3) for reading ID from the RFID vehicle tag and the RFID personnel tag, respectively. In one possible implementation, the RFID vehicle tags may be the passive type that do not have batteries, and the RFID personal tags may be the active type, which includes batteries, as described with respect to FIG. 1. Facial image reader 23 is used to take a digital facial image of a person who intends to pass through an access gate.

The data read by readers 22 and 23 are then sent to a computer 24 for further processing. Computer 24, after receiving the data, decodes the data received from RFID tag reader 22, retrieves stored vehicle information and personnel information from database 21 that correspond to decoded data, and performs a matching process to see if the decoded data matches with stored information. Moreover, computer 24 retrieves a stored face print from database 21 based on the decoded data obtained from RFID tag reader 22 and compares the stored face print with the facial image obtained from facial image reader 23. If all the information matches, then indication device 25 indicates that the vehicle and personnel are authorized to enter. If any of the information does not match with stored data, indication device 25 then indicates that a further investigation is necessary. In one embodiment of the present invention, the indication device 25 may be an indication light. In another embodiment of the present invention, the indication device 25 may be a lock controlling device that releases a lock when the vehicle and/or personnel are authorized entry, and keeps the lock closed when any of the vehicle data, personnel data and facial image does not match with stored information.

Figure 3:
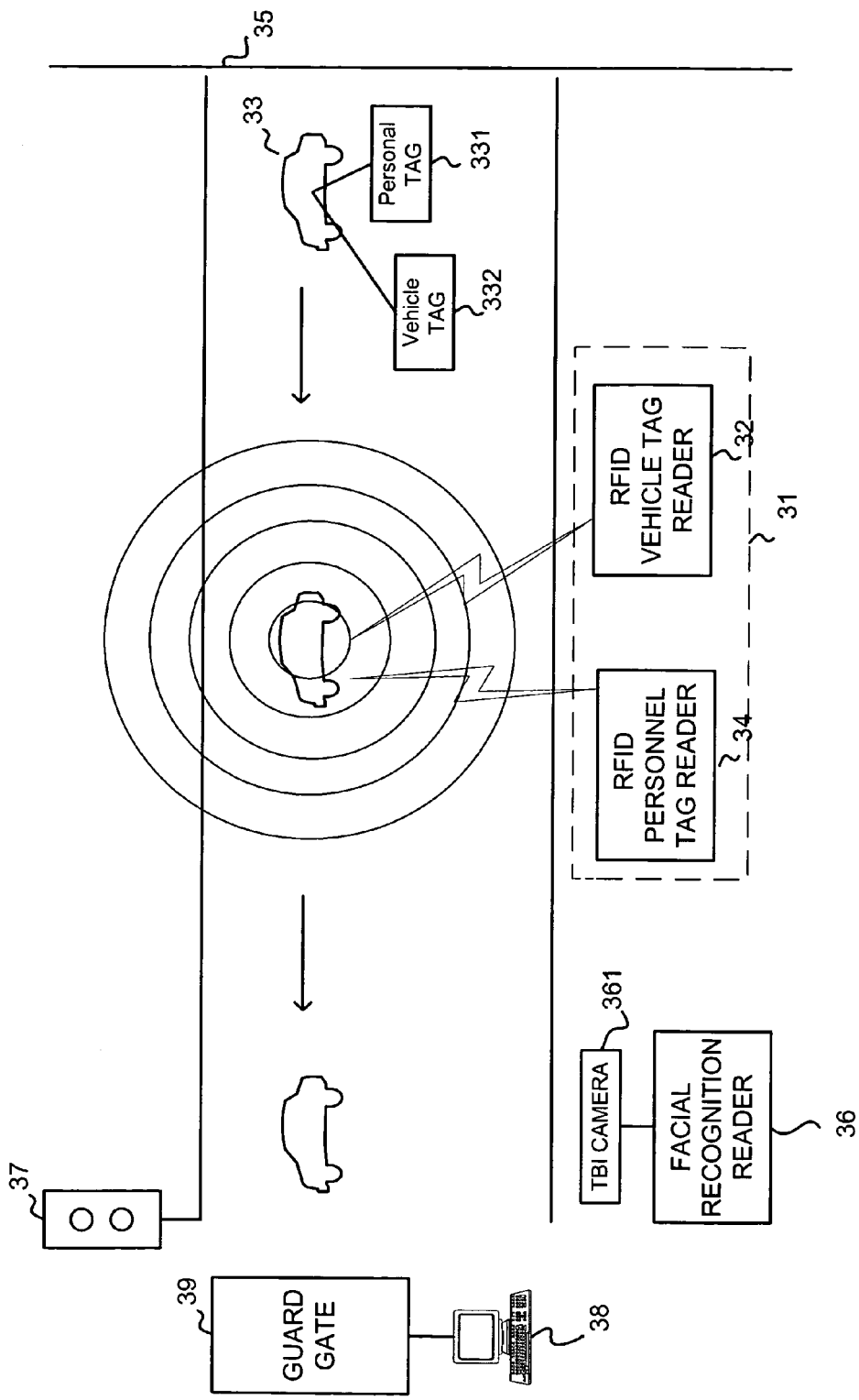
FIG. 3 is a schematic diagram of a security system in accordance with a second embodiment of the present invention, in which the security system is employed at a main gate of a facility to control entry of vehicles.

To further explain the security identification scheme of the present invention, FIG. 3 shows an exemplary security system in accordance with a first embodiment of the present invention. The security system of FIG. 3 is employed at a main gate of an organization or company to identify vehicles and drivers. Any vehicle (such as vehicle 33) and personnel who intend to pass through gate 39 is required to carry passive RFID vehicle tags 332 and active RFID personal tags 331 (although both devices could be active or both could be passive.) The security system includes passive RFID vehicle tag reader 32 and active RFID driver tag reader 34 that are installed at a first checkpoint at a distance from gate 39 for reading the RFID vehicle tags carried by vehicle 33 and the RFID personnel tags carried by personnel riding in vehicle 33. Although the passive RFID vehicle tag reader 32 and the active RFID driver tag reader 34 are separate readers in the embodiment, these two readers may be also included in a single reader 31. To ensure a secured identification, the system also preferably includes facial recognition system 36 that is installed closer to gate 39 for scanning facial images of the personnel in vehicle 33. The system further includes a computer 38 that is installed in a guard booth or a control office at gate 39 and is preferably remotely connected with a central computer (not shown).

In operation, RFID vehicle tag reader 32 and RFID personal tag reader 34 are arranged at a first checkpoint at locations close to sensing point 35. Therefore, when vehicle 33 passes through sensing point 35, such as a light beam, passive RFID vehicle tag reader 32 is first activated to read data from the RFID vehicle tag. Next, active RFID personal tag reader 34 is activated to read data from the RFID personal tag. The data read by readers 32 and 34 are immediately recorded and sent to computer 38 for further processing. It is noted that those data can be temporarily recorded in a database of the central computer or in a local database of computer 38. After an identification is complete, the data can be erased immediately or erased automatically after a period of time. Finally, when vehicle 33 reaches the position of facial recognition reader 36, a digital image camera such as TBI camera 361 installed in association with facial recognition system 36 takes a facial image of the driver, creates a face print for this particular driver, and sends the face print to computer 38.

After gathering all the data sent from readers 32, 34 and 36, computer 38 then retrieves information regarding the vehicle tag ID and the personal tag ID sent from readers 32 and 34 to check if the read IDs match as a pair with the IDs stored in the database. Computer 38 also compares the face print which was just created with thousands of face prints stored in the database for a facial recognition. However, in a preferred embodiment, the computer 38 retrieves a stored face print which corresponds to the RFID data read by readers 32 and 34 to compare the stored face print with the just-created face print for a one-to-one matching. If a match is declared an "access granted," such as a green light is given to the driver. If for any reason (e.g., RFID pair did not match the stored pair, or one or both RF ID tags are missing, or the face did not match), "access denied," such as a red light is given to the driver. As the driver approaches the final entrance to the facility, the RFID tags are read again and a final post-verification check is made to see if they are associated with an "access granted" or "access denied" decision at the entry location. Accordingly, the mechanical arm will remain up or will come down respectively, to block the entrance of an "access denied" vehicle which either intentionally or by mistake attempts to go through the final gate. The system of FIG. 3 may further include an indication light 37 which illuminates, for example, a green light when the driver and vehicle are authorized entry (authenticated), or a red light when unauthorized vehicle, unauthorized individual or incompatible face print is detected.

In some situations, there may be more than one person riding in vehicle 33. In this case, active RFID reader 34 and facial recognition reader 36 substantially simultaneously read each individual's RFID personnel tag and their facial images and create their individual face prints when vehicle 33 passes through readers 34 and 36. As mentioned above, after computer 38 receives all the data from readers 32, 34 and 36, computer 38 retrieves the stored data from the database for matching and then indicates if those individuals and vehicle are authorized to enter the gate.

Figure 4:
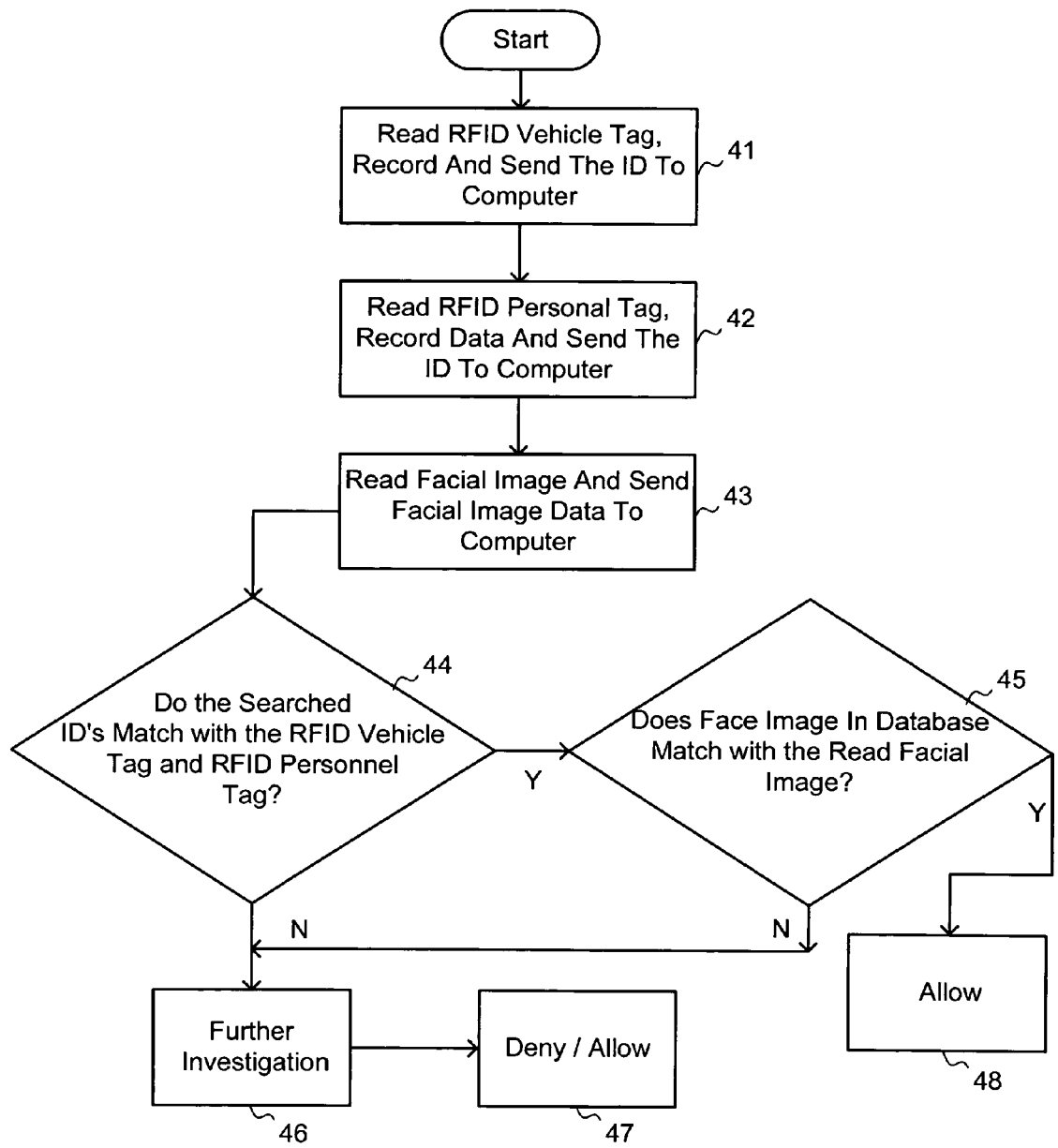
FIG. 4 is a flow chart showing an exemplary security identification method in accordance with the present invention.

FIG. 4 illustrates a dynamic stand-off biometric verification method in accordance with the present invention to capture and match face images of the individuals in the vehicles with face prints stored in the database of computer 38. As described above, when vehicle 33 passes through sensing point 35, it actives RFID vehicle tag reader 32, RFID personal tag reader 34 and facial recognition reader 36. As readers 32, 34 and 36 are arranged in an order from a distance to gate 39, RFID vehicle tag reader 32 first reads data from RFID vehicle tag. The data is then recorded and sent to computer 38, as shown at step 41. At step 42, RFID personal tag reader 34 reads data from RFID personnel tag. As indicated in step 41, the data is also recorded and sent to computer 38. At step 43, when vehicle 33 finally reaches reader 36, camera 53 (shown in FIG. 5) takes images of personnel in the vehicle. The images are also recorded and sent to computer 38 for further processing. Next, at step 44, computer 38 decodes the data read from readers 32 and 34, retrieves relevant data from database and compares those data. The relevant data may include information about vehicle 33, information about personnel who are riding in vehicles 33 and their face prints that are stored in the database. When the data read from readers 32 and 34 match with the retrieved relevant data, the process moves to step 45. At step 45, computer 38 processes the facial images, detects the faces, and compares the detected faces with the retrieved face prints. In the embodiment, if any one of the data read from readers 32 and 34 and the recognized face at steps 44 and 45 do not match with the retrieved relative data from the computers database, a guard is preferably available to stop vehicle 33 to ask for more identification information, as shown at step 46. In another embodiment, to maintain smooth traffic flow, the vehicle may be directed to another area which is separated from gate 39. A guard at this separate area may stop the vehicle and ask for more identification information. Upon investigation of other identification information, the guard can then decide if vehicle 33 and personnel are to be granted or denied entry through gate 39, as shown at steps 47 and 48.

Moreover, in accordance with the present invention, the matching process performed by computer 38 is preferably accomplished in, perhaps, less than 1 second, so that a guard at gate 39 can react and stop the vehicle in time should the vehicle and/or personnel not be authenticated. In a preferred embodiment of the present invention, when passing by facial recognition reader 36, it is not necessary for the driver to stop the vehicle or stay still for reader 36 to take the facial image. As the capture of facial image and the comparison process can be completed in a very short time, when the vehicle reaches gate 39, computer 38 has determined if this vehicle and/or driver are authenticated and has gate 39 react accordingly. This feature is beneficial because the system verifies the vehicle and personnel so rapidly that traffic congestion at the gate can often be avoided. Furthermore, because the system described herein is non-invasive, personnel in vehicles hardly notice the higher security level that is achieved.

To provide efficient facial recognition, the present invention preferably employs a facial recognition scheme that uses a near-infrared light spectrum to scan facial images by sensing the reflective IR light of human faces. The reflective near-infrared (near-IR) light spectrum scheme avoids a characteristic problem found in conventional visual spectrum systems in which a computer system may intermittently fix on, and attempt to analyze, a non-facial portion of the image. The facial recognition scheme of the present invention can quickly locate a face out of surrounding backgrounds so that the biometric data can be more efficiently captured and compared to that in the database. In turn, the processing speed of the facial recognition aspect of the system is greatly reduced.

More specifically, the facial recognition scheme of the present invention preferably uses a tri-band imaging (TBI) system, which uses common optics in low band near-IR, high band near-IR and visual band to analyze, detect and match a face.

Figure 5:
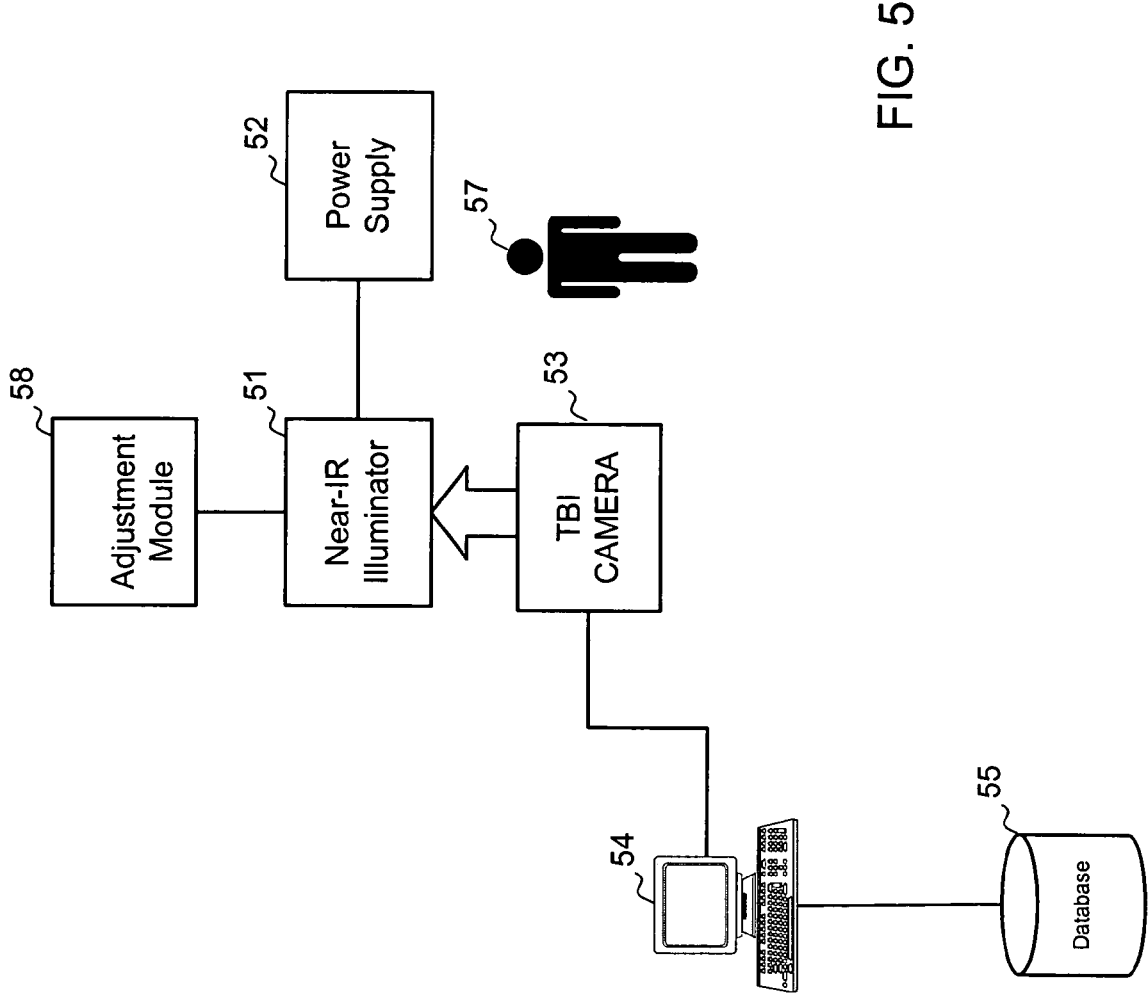
FIG. 5 is a schematic diagram showing an exemplary facial verification system in accordance with the present invention.

FIG. 5 is a schematic diagram of a facial recognition system that is preferably used in the present invention for identifying a facial image of a subject. The facial recognition system includes near-IR illuminator 51 for generating near-IR light with both high wavelength bands and low wavelength bands on subject 57 (which may be a person or several persons), a power supply for supplying power to near-IR illuminator 51, and a TBI camera 53 for taking three digital images of subject 57. The facial recognition reader 36 of FIG. 3 preferably employs the facial recognition system of FIG. 5. The system may also include an illumination adjustment module 58 that evaluates current luminance level in the scene and adjusts power output from power supply 53 to change a light level of near IR illuminator 51.

After facial images of subject 57 are taken, the images are then sent to computer 54 (same as computer 38 in FIG. 3) for processing to detect the face. Next, computer 54 searches database 55 for stored face prints that correspond to data read from RFID personal tag and/or RFID vehicle tag and compares the face print just obtained with stored face print/face prints.

Figure 6:
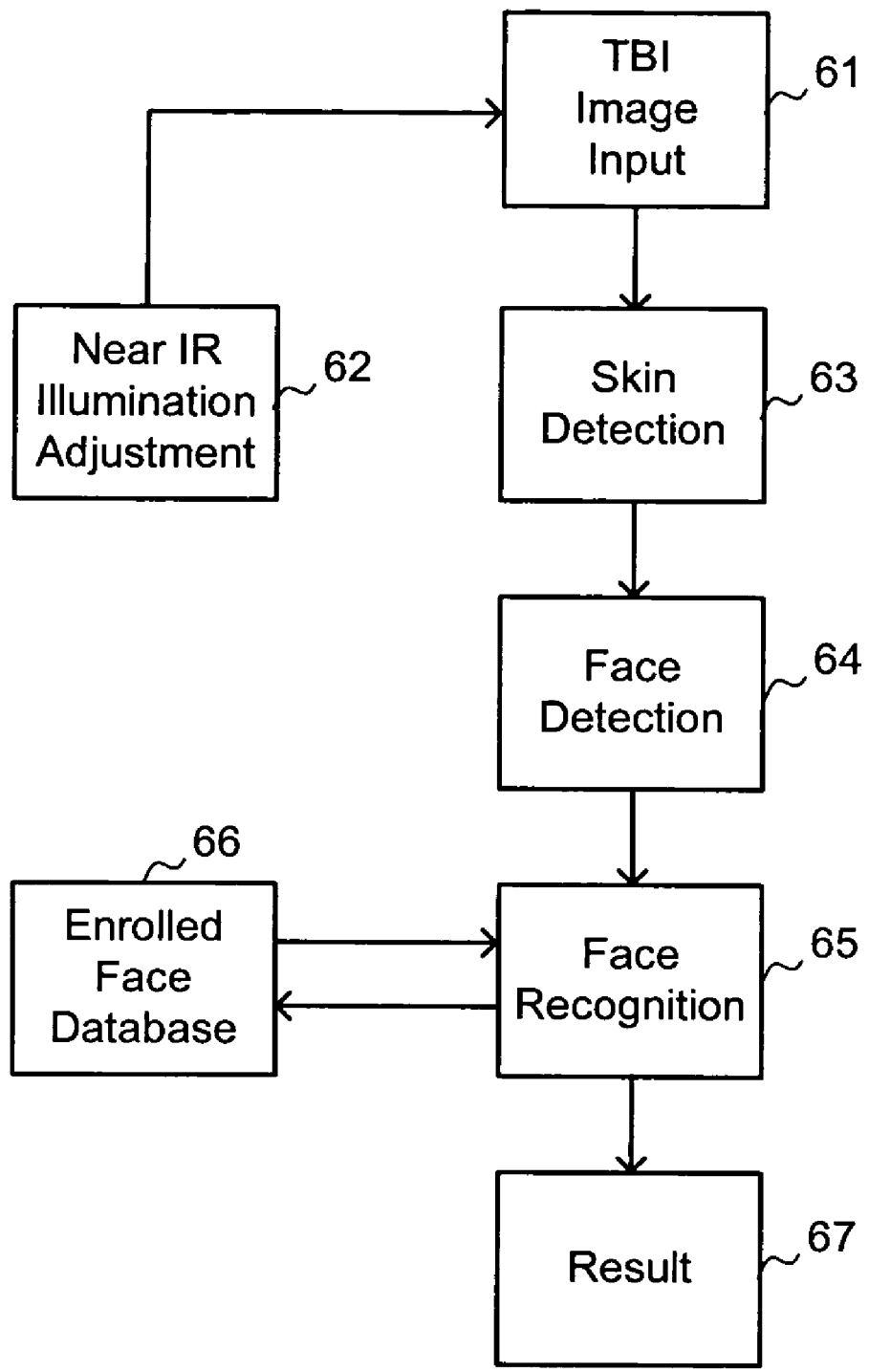
FIG. 6 is a flow chart that illustrates an exemplary facial verification method employed by a system like that shown in FIG. 5.

FIG. 6 shows a flow chart of a facial recognition method that can be practiced with the system of FIG. 5. As described above, when a vehicle passes a facial recognition reader such as reader 36 in FIG. 3, camera 53 takes pictures of a driver in the low near-IR band and high near-IR band. Images obtained by these two light bands are then sent to computer 54 for processing, as shown at step 61. Furthermore, illuminator adjustment module 58 constantly detects the luminance level at the scene and adjusts the illumination level of illuminator 51, at step 62. Computer 54 first performs a series of operations to isolate the skin in the images. Next, at step 64, computer 54 performs multi-band extraction operations to detect the face. As explained more fully below, the skin detection and face detection steps are preferably performed via tri-band image recognition. At step 65, a face is detected. At substantially the same time, at step 66, computer 54 retrieves a face print from database 55 and compares the retrieved face print with the detected face. After a matching comparison, a result showing the recognized face image matches or does not match with the retrieved face print is obtained, as shown at step 67. If it matches, a gate (such as gate 39 of FIG. 3) or a door (not shown) is released to allow vehicle and/or individuals to enter. If it does not match, the gate or door remained locked. As described above, computer 54 can retrieve the face print from database 55 according to data read from RFID vehicle tag and/or RFID personal tag that subject 57 drives and/or carries to perform a one-to-one matching comparison process. Computer 54 can also retrieve a number of face prints from database 55, thereby performing a one-to-many matching comparison process.

Figure 7:
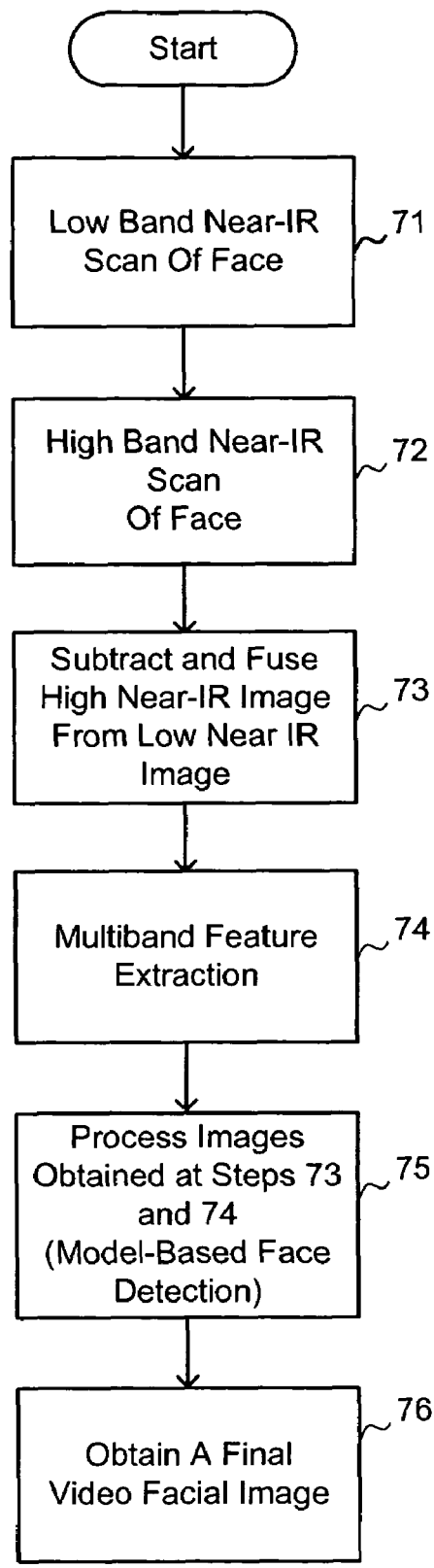
FIG. 7 is a flow chart that illustrates an exemplary tri-band-based face detection method employed by the method illustrated in FIG. 6.

FIG. 7 further explains a tri-band image detection and recognition process employed in the steps shown in FIG. 6. As described above, the facial recognition method of the present invention preferably utilizes low band near-IR light, high band near-IR light and visual band light to scan and detect a human face. At step 71, the method scans the facial image with low near-IR light and at step 72, the method scans the facial image with high near-IR light. At step 73, a high band image obtained at step 72 is subtracted (weighed) from a low band image obtained at step 71 and thresholded to obtain a skin image from the two near-IR images. Furthermore, at step 74, a feature image is extracted from the two near-IR images of steps 71 and 72 by a multi-band extraction scheme. Next, at step 75, computer 54 processes, as necessary, the feature image and the skin image obtained at steps 73 and 74, respectively. Processing may include, e.g., a series of generalized Hough transforms or model-sized algorithms. Such transforms or algorithms often lead to a good approximation of the location of the eyes, eyebrows, nose and mouth. And, based on the distance and relation between these features, a two-dimensional orientation and extent of the face is more easily obtained, at step 76. The obtained face is then compared by computer 54 with a retrieved face print from the database for matching.

Accordingly, the method and system of the present invention can effectively verify personnel and/or vehicles at a control gate by identifying data from RFID tags and matching facial images of the personnel with stored face prints. In addition to the control gate application, the method and system of the present invention can also be utilized in a building for controlling personnel access to different secured work areas. A facial recognition reader such as reader 23 of FIG. 2 can be installed at access control doors of each work area for capturing facial images of personnel. The data read from RFID personal tag and the facial image are then sent to a control computer for a verification process.

Furthermore, in the security system of FIG. 3, a second verification system that may include a RFID tag reader and a facial recognition reader (in this case, RFID tag reader 31 and facial recognition reader 36 can be considered as a "first" verification system) can also be installed inside of gate 39 for monitoring vehicle 33 after the vehicle is allowed to enter gate 39. This embodiment provides yet another level of security to the facility. The use of such a second verification system is referred to as a "post-verification system". A post-verification system provides enhanced security for individuals and facilities. For example, in the case whether there are many vehicles lined up after passing through a checking gate, the post-verification system can ensure that the entering vehicles are actually authorized vehicles.

Figure 8:
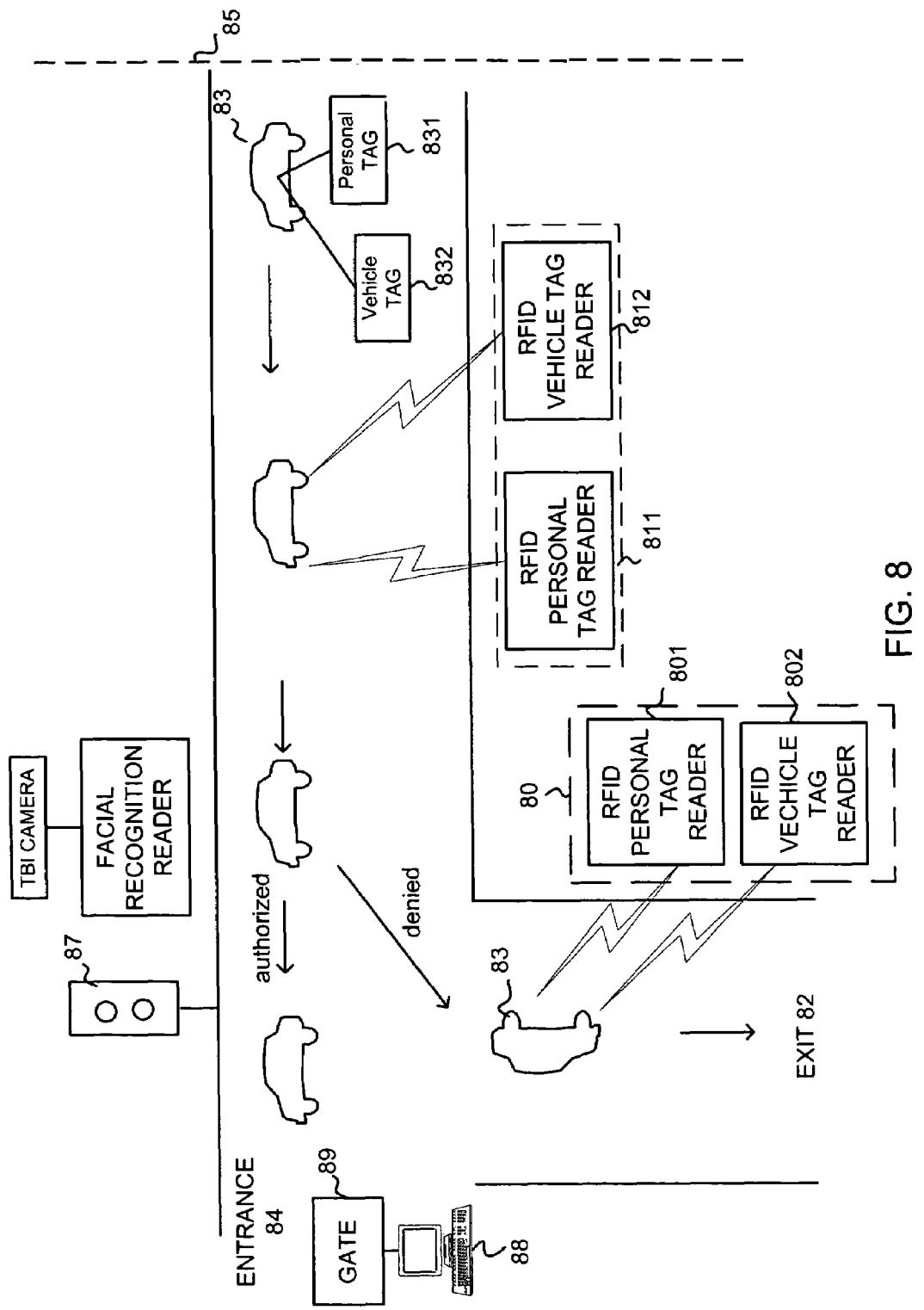
FIG. 8 is a schematic diagram showing an exemplary post-verification system in accordance with a first embodiment of the present invention.

FIG. 8 illustrates a first exemplary embodiment of the post-verification system in accordance with the present invention. Here, post-verification system 80 including RFID personal tag reader 801 and RFID vehicle tag reader 802 is installed at exit 82. Readers 801 and 802 may be the same or similar to readers 32 and 34 of FIG. 3, which are shown here as reference numbers 811 and 812. As described above with reference to FIGS. 3-7, the biometric verification of vehicle 83 and the driver in vehicle 83 by the first verification system is performed when vehicle 83 passes sensing point 85 before gate 39. If the information associated with the driver and vehicle 83 read by the first verification system are authorized and matched, vehicle 83 will be directed to entrance 84. Otherwise, vehicle 83 is directed to exit 82 and indication light 87 indicates a red light. To ensure that the unauthorized vehicle actually leaves the facility, post-verification system 80 is installed at exit 82 to read vehicle tag 831 and personal tag 831. The data read by post-verification system 80 is then sent to computer 88 for comparing with data previously read by the first verification system to determine if those two data match. If unauthorized vehicle 83 nevertheless actually passes through entrance 84 into the facility by, perhaps, another car tripping the gate bar open, an alarm is preferably generated signifying that a match of the two IDs (at sensing point 88 and exit 82) was not satisfied.

Figure 9:
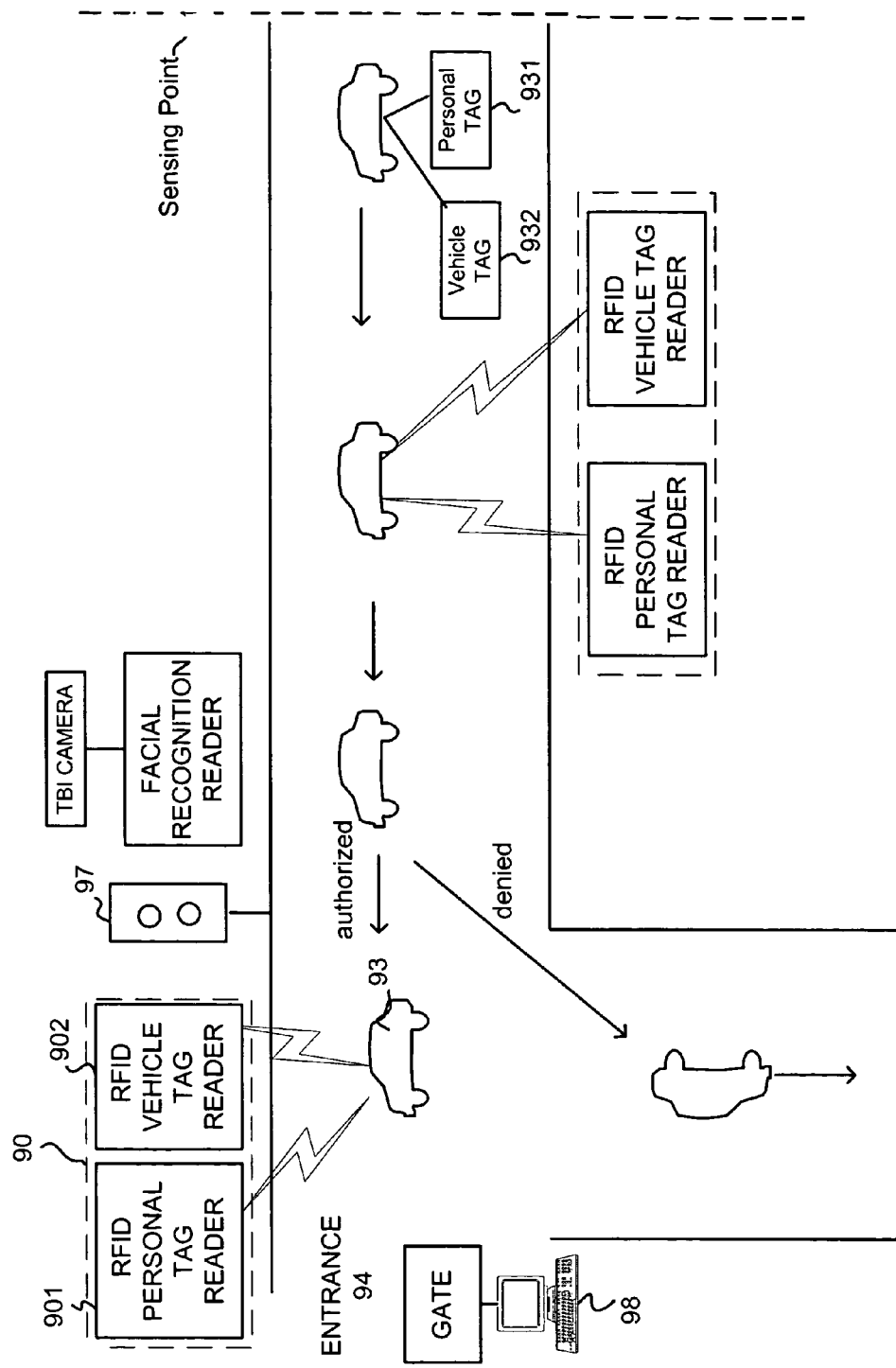
FIG. 9 is a schematic diagram showing an exemplary post-verification system in accordance with a second embodiment of the present invention.

FIG. 9 illustrates a second exemplary embodiment of the post-verification system in accordance with the present invention. In this embodiment, post-verification system 90 including RFID personal tag reader 901 and RFID vehicle tag reader 902 is installed in front of entrance 94. In one preferred embodiment, a gate (not shown) can also be preferably installed at entrance 94. As described above, if vehicle 93 and the driver are authorized the first verification system, vehicle 93 is directed to entrance 94 and indication light 97 indicates a green light. Otherwise, vehicle 93 is directed to exit 92 and a red light is indicated by indication light 97. In the same manner, at entrance 94, post-verification system 90 reads the data stored in vehicle tag 932 and personal tag 931 and sends the data to computer 98 for a match comparison. If the data match, the bar will be opened to allow the vehicle to go through the entry. Otherwise, an alarm will signify that the match of the two IDs was not satisfied.

Figure 10:
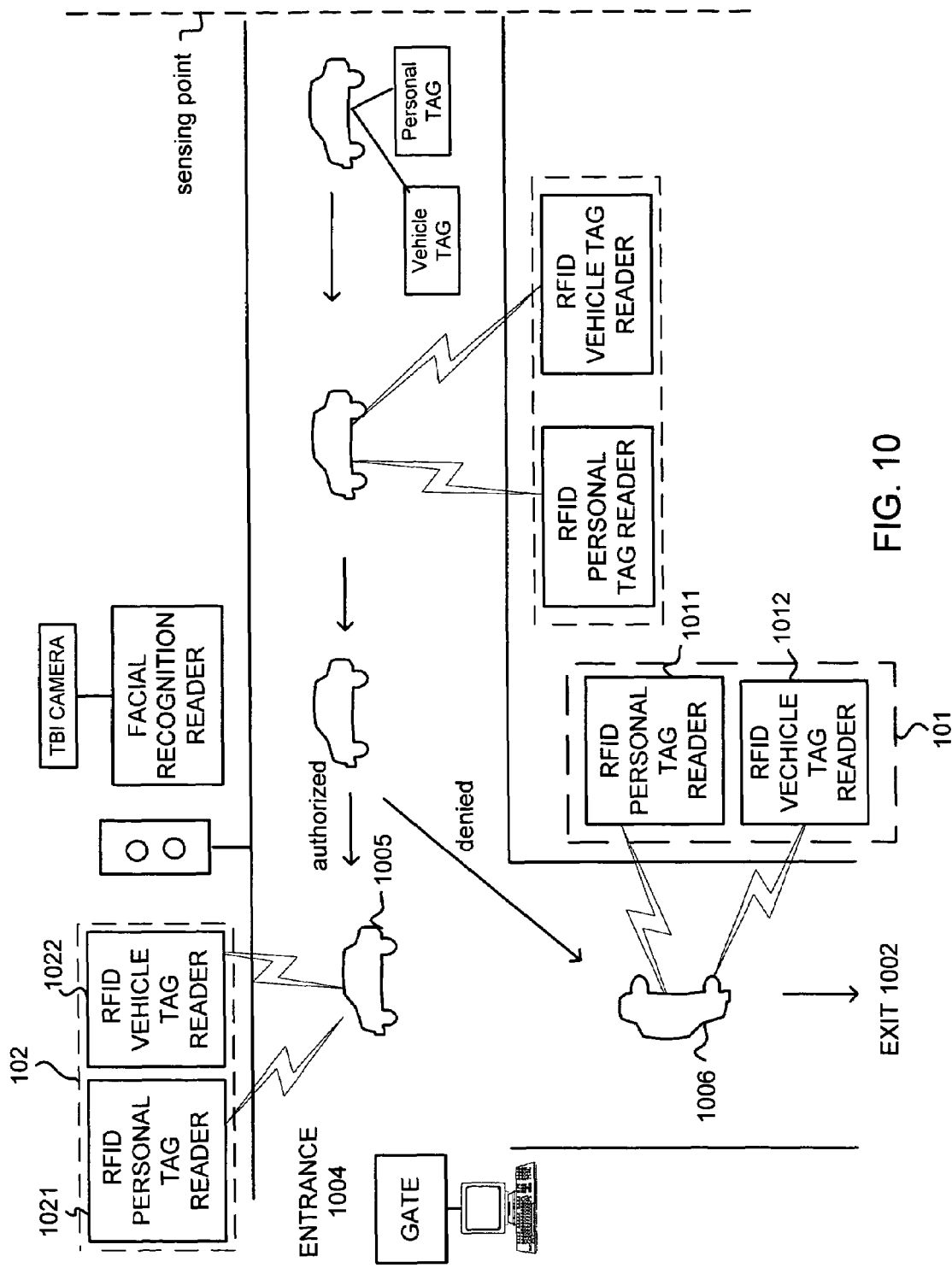
FIG. 10 is a schematic diagram showing an exemplary post-verification system in accordance with a third embodiment of the present invention

FIG. 10 illustrates a third exemplary embodiment of the post-verification system in accordance with the present invention, in which two post-verification systems 101 and 102, each comprising personal tag reader 1011, 1021 and vehicle tag reader 1012, 1022 are respectively installed at entrance 104 and exit 102 to post-verify authorized vehicle 1005 and unauthorized vehicle 1006. This embodiment is perhaps the most reliable verification system because it ensures that the vehicles are going in the correct directions.

Thus, the present invention not only provides a system and method for both dynamic and stand-off biometric verification, but also provide a system and method for complete pre- and post- verifications to provide enhanced security protection. Furthermore, although the post-verification system described in FIGS. 8-10 comprises an RFID vehicle tag reader and a RFID personal tag reader, the post-verification system, in accordance with the present invention, may only comprise one single reader to simultaneously read data from the vehicle RFID tag and the individual RFID personal tag. The post-verification system may further comprise a facial recognition system and a TBI camera that are similar to system 36 and TBI camera 361, as shown in FIG. 3, so that the post-verification system not only compares data read from the RFID tags, but also compares the face images of the individuals in the vehicle with face prints stored in the computer.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for providing dynamic security verification, comprising:
   storing data regarding information and a face print of a person in a data base, wherein the face print is represented by numerical codes of a face image of the person;
   at a first checkpoint, reading an RFID device and relating a read RFID number to the information stored in the database, retrieving a face print corresponding to the RFID device from the database;
   scanning the face of the person at said first checkpoint with low near infrared (IR) light and high near-IR light to obtain a first facial image and a second facial image, respectively;
   subtracting the second facial image from the first facial image to obtain a skin image of the person;
   performing a multi-band extraction on the first and second facial images to obtain a third facial image;
   combining the skin image and third facial image to obtain a final facial image;
   comparing the final facial image with the retrieved face print; and
   at a second checkpoint, re-reading the RFID device and re-scanning the face and comparing the re-read RFID device and facial image with the information read at the first checkpoint.

2. The method of claim 1, wherein the face of the person is scanned dynamically and automatically when the person passes by a reading point.

3. The method of claim 1, wherein if the results after comparisons of the RFID data at the first and second checkpoints do not match, an alarm signal is made indicating a mismatch has occurred.

4. The method of claim 1, wherein the second RFID checkpoint is located near an exit.

5. The method of claim 1, wherein the second RFID checkpoint is located near an entrance.

6. The method of claim 1, wherein the second checkpoint is located near an exit and a third checkpoint is located near an entrance.

7. A method for dynamically verifying a vehicle and a person riding in the vehicle at a control gate, the method comprising:
storing information associated with the person's RFID tag, wherein the information associated with the person comprises personal information including a face print of a person in a data base, wherein the face print is represented by numerical codes of a face image of the person and vehicle information regarding a vehicle that the person is driving;
at a first sensing point, reading an ID from the RFID tag when the vehicle and relating a read RFID number to the information stored in the database, and retrieving a face print corresponding to the RFID tag from the database;
scanning the face of the person at said first sensing point with low near infrared (IR) light and high near-IR light to obtain a first facial image and a second facial image, respectively;
subtracting the second facial image from the first facial image to obtain a skin image of the person;
performing a multi-band extraction on the first and second facial images to obtain a third facial image;
combining the skin image and third facial image to obtain a final facial image;
comparing the final facial image with the retrieved face print;
at a second checkpoint, re-reading the ID from the RFID tag and re-scanning said face, and sending re-read data to the computer;
retrieving template data corresponding to the data read from the RFID tag and the facial image at the first sensing point; and
comparing the retrieved template data and the facial image with data read at the second sensing point to determine whether the template data and the facial image and the data and the facial image read at the second sensing point match.

8. The method of claim 7, further comprising indicating if the vehicle and the person are authorized entry and if so, directing the vehicle and the person to an entrance when the ID read from the RFID tag and the facial image of the person match with the data and the face template stored in the database.

9. The method of claim 7, wherein the re-reading and comparing are performed at the entrance.

10. The method of claim 7, wherein when either one of the IDS read from the REID tags and the facial image of the person fails to match with data and the face templates stored in the database, the vehicle is directed to an exit.

11. The method of claim 7, wherein the re-reading and comparing are performed at the exit.

12. A system for dynamic stand-off verification at a control gate, comprising:
a database for storing data regarding the information of a plurality of individuals wherein the information associated with the person comprises personal information including a face print of a person in a data base, wherein the face print is represented by numerical codes of a face image of the person;
a first verification device installed at the control gate comprising a first RFID tag reader for reading data from an RFID tag on which information of an individual is stored and for scanning the face of the person with low near infrared (IR) light and high near-IR light to obtain a first facial image and a second facial image, respectively and subtracting the second facial image from the first facial image to obtain a skin image of the person performing a multi-band extraction on the first and second facial images to obtain a third facial image, said first verification device further being adapted to combining the skin image and third facial image to obtain a final facial image;
a computer for processing the data read by the RFID tag reader and scanner, and a second verification device installed on at least one of an entrance and an exit, comprising at least one of a second REID tag reader for reading the RFID tag and a second scanner for scanning the face of the person with low near infrared (IR) light and high near-IR light to obtain a second set of first facial image and a second facial image, respectively and subtracting the second facial image from the first facial image to obtain a skin image of the person performing a multi-band extraction on the first and second facial images to obtain a third facial image, said first verification device further being adapted to combining the skin image and third facial image to obtain a second final facial image;
comparing the final facial image with the retrieved face print;
at a second checkpoint, re-reading the ID from the RFID tag and sending re-read data to the computer;
retrieving template data corresponding to the data read from the RFID tag and the facial image at the first sensing point;
wherein the data read by the first verification device are sent to the computer for comparing the retrieved template data and the facial image with data read at the second sensing point to determine whether the template data and the facial image and the data and the facial image read at the second sensing point match.

13. The system of claim 12, further comprising a sensor that is activated when the individual passes a sensing line, and the activation of the sensor further activates a sequence for the first RFID tag reader and the first facial recognition reader.

14. The system of claim 12, wherein the personal information stored in the RFID tag includes information regarding the individual and a vehicle the individual is driving.

15. The system of claim 14, wherein the RFID tag comprises an REID vehicle tag on which the information regarding the vehicle is stored and an RFID personnel tag on which the information regarding the individual is stored.

16. The system of claim 12, further comprising a first indication device for indicating if the ID read from the first RFID tag and the first facial image read by the facial recognition data match with the data and facial templates stored in the database.

17. The system of claim 12, further comprising a second indication device for indicating if the ID read by the first and second devices are matched.

18. The device of claim 12, wherein the facial recognition reader includes an illumination adjustment module for adjusting the near-IR light based on environmental lighting conditions.

* * * * *